United States Patent [19]
Davidson

[11] 3,781,911
[45] Dec. 25, 1973

[54] APPARATUS FOR MONITORING THICKNESS OF EVAPORATED FILM

[75] Inventor: James J. Davidson, West Lafayette, Ind.

[73] Assignee: The United States of America as represented by the Secretary of the Navy, Washington, D.C.

[22] Filed: Mar. 22, 1973

[21] Appl. No.: 343,772

[52] U.S. Cl. ............................ 324/65 R, 338/308
[51] Int. Cl. ........................................ G01r 27/02
[58] Field of Search ............... 324/65 R, 158 R; 338/308; 117/226

[56] References Cited
UNITED STATES PATENTS

| | | | |
|---|---|---|---|
| 3,535,631 | 10/1970 | De Geest et al. | 324/65 R |
| 2,921,257 | 1/1960 | Boicey | 324/65 R |
| 2,947,939 | 8/1960 | Harwig | 324/65 R |
| 3,374,112 | 3/1968 | Danon | 324/65 R X |
| 3,495,170 | 2/1970 | Biard et al. | 324/158 R X |

OTHER PUBLICATIONS

Blumberg et al., Indium Superconductive Film Stores, IBM Technical Disclosure Bulletin, Oct. 5, 1965, p. 823.

*Primary Examiner*—Stanley T. Krawczewicz
*Attorney*—R. S. Sciascia et al.

[57] ABSTRACT

An apparatus for monitoring the thickness of a film as it is evaporated onto a substrate having a signal applicator for maintaining a voltage across the film. An oscillator is used to provide a constant voltage to the signal applicator and the resulting current through the film is measured across a series resistor by a differential amplifier. The output from the differential amplifier is connected to a detector and visual indicator.

3 Claims, 3 Drawing Figures

APPARATUS FOR MONITORING THICKNESS OF EVAPORATED FILM

BACKGROUND OF THE INVENTION

The present invention relates to a device for measuring the thickness of evaporated metallic films and more particularly to a device for monitoring the thickness of metallic films during deposition onto substrates.

There is a constant demand for smaller electrical and electronic components, particularly in the aircraft field, as weight is of extreme importance. One concept of micro-electronics which offers a great reduction in size and weight of electronic units is that of integrated circuitry on ceramic substrates. Integrated circuitry includes a number of components, such as resistors, capacitors, fuses, conductors, and active devices which are fabricated by one or more of a combination of several thin film deposition techniques onto a glass or ceramic substrate.

Deposition of materials is normally accomplished through a mask under vacuum conditions, and while the mask controls the width and length of the pattern being formed there is no readily available device or method for controlling the depth of the pattern. One device directed to the measurement of film thickness during deposition onto a substrate is described in U. S. Pat. No. 3,645,623, entitled, "Apparatus For Monitoring Film Thickness By Reflecting A Light Beam From The Film Surface", which issued Feb. 29, 1972, to Raymond A. Patten. In this patented device, two distinct light beams are formed by a grid and chopper and imaged onto separate halves of the substrate and reflected therefrom in parallel beams at an angle of 85.5°. The light reflected from the substrate is directed through a fixed grating by a suitable optical imaging system and directed onto a light detector. The light of each beam reflected by the substrate is subtracted such that any difference will be proportional to the thickness of the film. Therefore, one-half of the substrate is masked such that the film is deposited onto only one-half of the substrate. As the film builds up, the light reflected by the side upon which the film is deposited will be moved laterally. Lateral movement of the light causes a displacement in the reflected light beam. Therefore, a portion of the displaced reflected light will be blocked by the fixed grating. Blocking of a portion of the light will produce a difference in the intensity of the two beams emerging from the grating and being detected. By subtracting the light intensity of one beam from the other, a resultant signal proportional to the film thickness is generated.

Another method and apparatus for measuring the deposits on a substrate is shown and described in U. S. Pat. No. 3,374,112, entitled, "Method And Apparatus For Controlled Deposition Of A Thin Conductive Layer", which issued Mar. 19, 1968, to David Danon. In this patent, a technique is described for controlling the thickness of a deposited layer by observing the change of resistance of a gap between two conductive regions. The member to be coated is placed near the gap region. As the vapor deposition proceeds, the gap region is slowly covered with an increasing thickness of conductive material, thereby lowering the resistance across the gap. The resistance is lowered proportionally to the thickness of the coating so that an ohmmeter reading will give a direct indication of the coating thickness.

SUMMARY OF THE INVENTION

The present invention relates to a device for monitoring the thickness of an evaporated metal film as it is being deposited onto a substrate. An oscillator produced an alternating current voltage which is applied through an operational amplifier to a resistance load. The film being deposited is connected in series with the resistance load. A differential amplifier is provided to convert the differential voltage across the resistance load into a single ended output which is used to drive an indicator which is calibrated to indicate the thickness of the metal film.

DESCRIPTION OF THE PREFERRED EMBODIMENT

Figure 1:
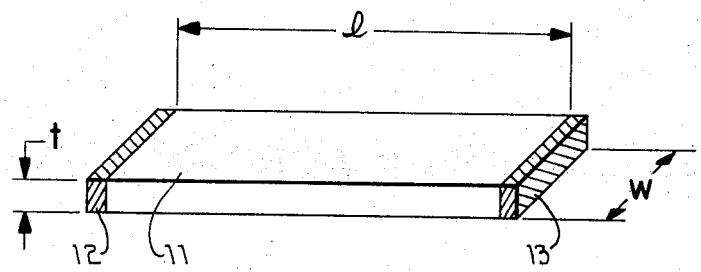
FIG. 1 is a diagrammatic view showing the dimensions of a thin film.

Referring now to the drawing, there is shown a rectangular area of thin film 11 having the dimensions 1, $w$, and $t$, and having end contacts 12 and 13. The resistance ($R_F$) of the film 11 in the direction 1 is:

1. $R_F = p(1/wt)$;

where $p$ is the resistivity of the material of film 11.

If a constant AC voltage is applied to the film, then

2. $I = V/R_F$ and, substituting $R_F$ from equation (1), then

3. $I = Vwt/pl$

With a constant AC voltage being applied:

4. $Vw/pl = K$ and, therefore

5. $I = Kt$

Thus the current is directly proportional to the film thickness, with the proportionality constant being determined by the applied voltage, the material resistivity and the film geometry.

Figure 2:
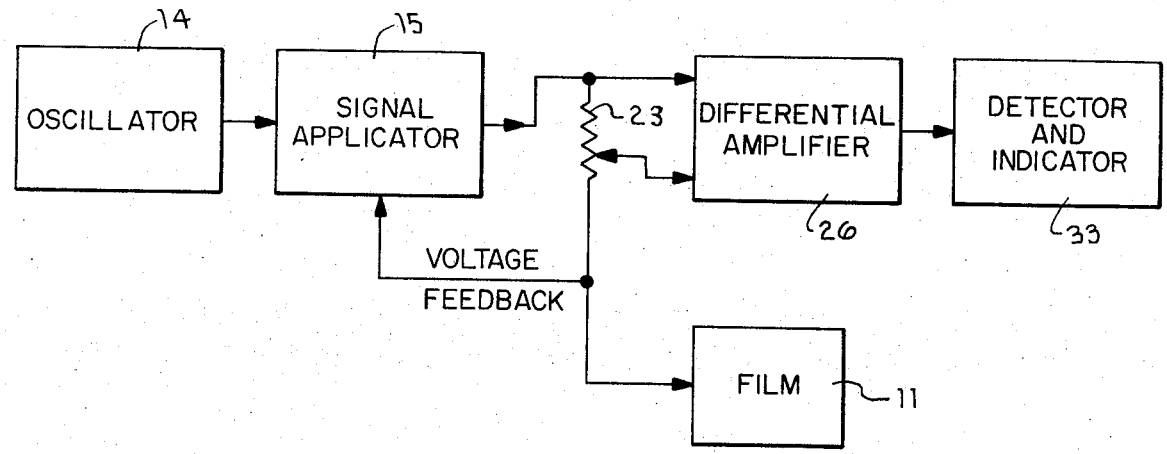
FIG. 2 is a block diagram of a preferred embodiment of the present invention.
Figure 3:
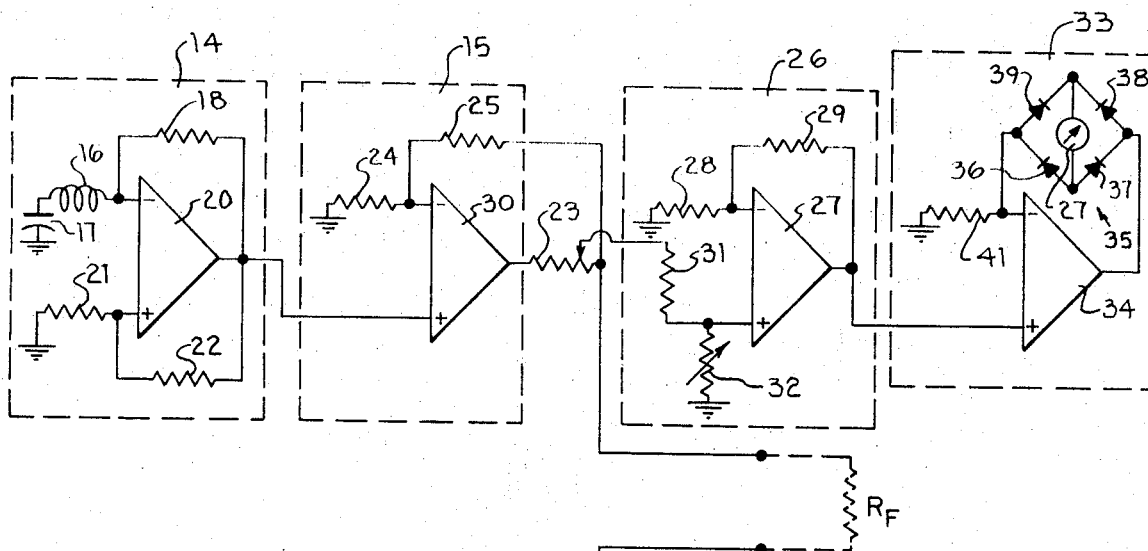
FIG. 3 is a schematic diagram of the preferred embodiment.

Referring now to FIGS. 2 and 3 of the drawing, an oscillator 14 delivers a constant voltage to signal applicator 15 which maintains a fixed voltage across film 11. Oscillator 14 comprises an operational amplifier 20 and the series tuned circuit on the inverting input has an impedance minimum at 6. $\omega_o = 1/\sqrt{L_1 C_1}$, where $L_1$ and $C_1$ are the values for inductor 16 and capacitor 17, respectively.

The negative feedback through resistor 18 is minimized at this frequency ($\omega_o$). The positive feedback, however, which is determined by the values of resistors 21 and 22 is frequency independent. Any time the positive feedback is greater than the negative feedback, the circuit will oscillate.

Signal applicator 15 comprises an operational amplifier 30 designed to operate under a wide range of feedback conditions because of the wide range of resistance values of film 11. The feedback for signal applicator 15 is taken from a voltage divider consisting of resistor 23 and the resistance $R_F$ of film 11. For proper operation, it is important that the voltage across the film remain constant regardless of the value of the resistance ($R_F$) of the film and thus, the output impedance of the signal applicator, including resistor 23, must always be very much less than $R_F$, and this is achieved by feedback.

Differential amplifier 26 is provided to convert the differential voltage across resistor 23 into a single-ended output. Except when the film resistance $R_F$ is either infinity or zero, there are two signals appearing on resistor 23. One signal is a differential voltage representing the current through film 11 and the second is a common-mode voltage equal to the voltage across film 11. As it is desired to measure only the film current, the common-mode voltage constitutes an error signal which must be rejected if high accuracy is to be achieved. This is achieved by having the common-mode gain substantially less than the differential gain. For example, to obtain a common-mode error of less than 0.1 percent of full scale of meter 27, the common-mode gain must be 60 db less than the differential gain. This is not an extremely difficult specification to meet, but some care is necessary. In particular, the external circuitry must be such that identical signals are fed to both inputs of amplifier. The voltage divider consisting of resistors 28 and 29 must be exactly balanced by the voltage divider consisting of resistors 31 and 32.

Referring specifically to FIG. 3 of the drawing, the detector and indicator 33 includes an operational amplifier 34 which provides sufficient gain to overcome the threshold voltage of bridge rectifier 35 and keep meter 27 linear down to as close to zero as possible. By way of example, diodes 36 to 39 in rectifier 35 might be silicon diodes and each have a threshold voltage of about 0.6 volt. Therefore about 1.2 volts would need be supplied to the bridge circuit before meter 27 would provide an indication. While diodes 36 to 39 are in a non-conducting state, there is no feedback to the inverting input of amplifier 34 and the gain is very high. A very small AC signal at the non-inverting input is sufficient to produce 1.2 volts peak at the output and start the diodes conducting. Once the diodes start to conduct, the voltage gain is determined by the series resistance of the meter and the diodes working against the resistor 41.

It can thus be seen that the present invention provides a novel device for monitoring the thickness of a film as it is being deposited onto a substrate.

Obviously many modifications and variations of the present invention are possible in the light of the above teachings. It is therefore to be understood that within the scope of the appended claims the invention may be practiced otherwise than as specifically described.

I claim:

1. Apparatus for monitoring the thickness of a film during deposition of said film onto a substrate comprising,
   a source of alternating current,
   a resistive load connected in series at a junction point with said film being deposited,
   a feedback amplifier having an input connected to said source of alternating current, an output connected to one end of said resistive load, and having a feedback connection connected to said junction point,
   means for detecting current flow through said resistive load, and
   means for visually indicating the amount of current detected.

2. Apparatus for monitoring the thickness of a film as set forth in claim 1 wherein said resistive load is a potentiometer.

3. Apparatus for monitoring the thickness of a film as set forth in claim 1 wherein said means for visually indicating the amount of current detected comprises an amplifier, a bridge rectifier circuit, and a meter connected in said bridge rectifier circuit.

* * * * *